(12) United States Patent
Imai

(10) Patent No.: US 11,842,093 B2
(45) Date of Patent: Dec. 12, 2023

(54) SYSTEM AND METHOD

(71) Applicant: CANON KABUSHIKI KAISHA, Tokyo (JP)

(72) Inventor: Tetsu Imai, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/045,103

(22) Filed: Oct. 7, 2022

(65) Prior Publication Data

US 2023/0115851 A1 Apr. 13, 2023

(30) Foreign Application Priority Data

Oct. 11, 2021 (JP) .................................. 2021-166729

(51) Int. Cl.
*G06F 3/12* (2006.01)

(52) U.S. Cl.
CPC ............ *G06F 3/1207* (2013.01); *G06F 3/121* (2013.01); *G06F 3/1204* (2013.01); *G06F 3/1234* (2013.01); *G06F 3/1259* (2013.01); *G06F 3/1287* (2013.01); *G06F 3/1288* (2013.01)

(58) Field of Classification Search
CPC ...... G06F 3/1207; G06F 3/1204; G06F 3/121; G06F 3/1234; G06F 3/1259; G06F 3/1287; G06F 3/1288

USPC ........................................................ 358/1.14
See application file for complete search history.

(56) References Cited

U.S. PATENT DOCUMENTS

| | | | |
|---|---|---|---|
| 11,475,464 B2* | 10/2022 | Pacotto | G06Q 30/0185 |
| 2002/0095508 A1* | 7/2002 | Okazawa | H04L 41/069 |
| | | | 709/206 |
| 2006/0279780 A1* | 12/2006 | Anno | G06F 3/1263 |
| | | | 358/1.15 |
| 2007/0091010 A1* | 4/2007 | Richardson | H04L 67/02 |
| | | | 345/2.1 |

FOREIGN PATENT DOCUMENTS

JP 2020192730 A 12/2020

* cited by examiner

*Primary Examiner* — Darryl V Dottin
(74) *Attorney, Agent, or Firm* — Canon U.S.A., Inc. IP Division

(57) ABSTRACT

Embodiments of the present disclosure relate to a second system cooperating with a first system communicating with a client apparatus. User information registered in the second system is managed in association with corresponding user information registered in the first system. In a case where an error is detected in the received print job, and the print job is received from the first system, an error notification to user information registered in the first system, corresponding to user information on a user as an owner of the print job is requested from the first system.

8 Claims, 13 Drawing Sheets

```
PRINT SERVICE 101                               USR00001

PRINT    SCAN    SETTINGS

┌─────────────────────────────────────────────────────┐
│ ERROR HAS OCCURRED. PLEASE CHECK DETAILS.           │
│  · JOB                                              │
│     · JOB00001                                      │
│  · OCCURRENCE DATE AND TIME                         │
│     · 2020.4.1 12:34.56                             │
│  · ERROR                                            │
│     · PRINT POLICY ERROR (ERR00001)                 │
└─────────────────────────────────────────────────────┘

MYDEVICE01      READY       2F-201

MYDEVICE02      READY       5F-504
```

```
☐ VENDOR                                    LINKEDUSER001

LINKED SERVICE 102

PRINT     ┌─────────────────────────────────────────────────┐
MANAGE    │ FOLLOWING ERROR HAS OCCURRED. PLEASE CHECK      │
          │ DETAILS FROM LINK.                              │
STORAGE   │ LINKEDERR001: PRINT POLICY ERROR (2020.4.1 12:34.56)│
          │ LINKED.SERVICE/LINK                             │
SETTINGS  └─────────────────────────────────────────────────┘
          MYDEVICE01      READY       2F-201
          MYDEVICE02      READY       5F-504
          MYDEVICE03      !ERROR      3F

LOGOUT
```

SYSTEM AND METHOD

BACKGROUND

Field of the Disclosure

The present disclosure relates to a technique to manage an image forming apparatus including a print function, and print data.

Description of the Related Art

Along with promotion of diversified working styles, needs for managing printing by employees in an organization are growing. Therefore, introduction of cloud print in which printing is performed through a print server operated by the organization is increased in an office environment.

As an existing technique, a technique in which, in a case where an error occurs on a print apparatus during use of the cloud print, the error is notified to a print server, and the print server internally holds and manages a state of the print apparatus as an "error occurring state" is discussed (e.g., Japanese Patent Application Laid-Open No. 2020-192730).

The state of the print apparatus can be checked through access to a management screen provided by the print server.

SUMMARY

According to embodiments of the present disclosure, a second system cooperating with a first system communicating with a client apparatus includes a management unit configured to manage user information registered in the second system in association with corresponding user information registered in the first system, a reception unit configured to receive a print job, and a request unit configured to, in a case where an error is detected in the received print job and the print job is received from the first system, request the first system to perform an error notification to user information registered in the first system, corresponding to user information on a user as an owner of the print job.

Further features of the present disclosure will become apparent from the following description of exemplary embodiments with reference to the attached drawings.

BRIEF DESCRIPTION OF THE DRAWINGS

FIGS. 12A and 12B each illustrate an error notification screen.

DESCRIPTION OF THE EMBODIMENTS

Figure 1:
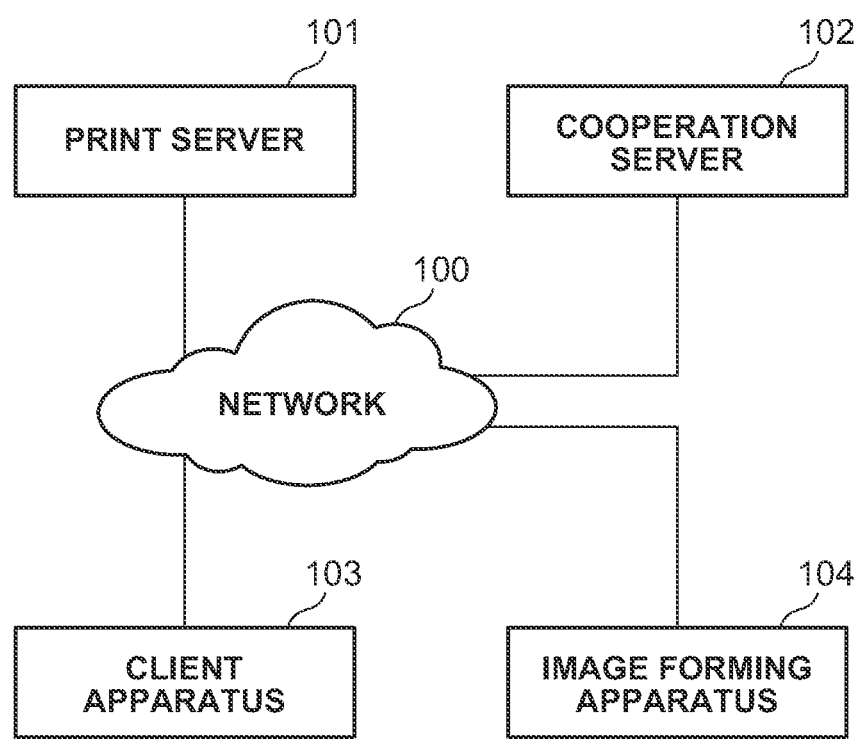
FIG. 1 is a block diagram illustrating a configuration example of a network system.

It is assumed that a print system is constructed by causing a plurality of cloud services different in purpose and service contents to cooperate with each other, in the future.

One of the services provides a document management service such as document editing, in addition to a print service such as management of data input as a print target and management of apparatus information on an image forming apparatus performing printing. The other service provides a service to manage a status and a print history received from the image forming apparatus, in addition to the print service such as management of data input as a print target and management of apparatus information on the image forming apparatus performing printing.

In a case where an error occurs in the print data to be printed by the image forming apparatus while the plurality of cloud services cooperates with each other as described above, it is desirable to notify the error to a user as an owner of the print data input to the print system.

In the print system constructed as described above, however, an error may be detected in a cloud service that is different from the cloud service used when the user inputs the print data. In this case, when the user receives an error notification from a service not directly used by the user when the user inputs the data, the user may erroneously recognize that the error notification does not relate to the print data input by the user, or the user may not notice that the error notification is an error notification for the user himself/herself.

Embodiments of the present disclosure are directed to a mechanism that reduces occurrence of such issues in the error notification even in the case where the print system is constructed by causing the plurality of cloud services to cooperate with each other.

Some exemplary embodiments of the present disclosure are described below with reference to drawings. In the exemplary embodiments, it is assumed that a print system is constructed by using two cloud services providing a print service. A client apparatus that is used by a user to input print data through a network such as the Internet, and an image forming apparatus that can print print data received from the print system through the network are connected to the print system. In one of the cloud services, a print server illustrated in FIG. 1 operates, and in the other cloud service, a cooperation server that can cooperate with the print server operates. In the cloud service in which the cooperation server operates, a print server (not illustrate) also operates, and a print service in which input print data is transmitted to an image forming apparatus managed by the print server and is printed can be provided.

In a case where the user registers an own user account (user identification (ID)) in each of the cloud services, the user can input print data to any of the cloud services. In each of the cloud services, account information corresponding to the user is independently managed. Therefore, in the exemplary embodiments of the present disclosure, a mechanism that associates the account information in the two cloud services with each other is newly provided, as described below.

Further, in the exemplary embodiments of the present disclosure, a case where, when an error occurs on an image forming apparatus that prints print data transmitted to the print server directly from the client apparatus or through the cooperation server, error information is notified, is assumed. In the following, data including information to specify the print data to be printed, information about print setting, and information about other print control is referred to as a print job. In the following exemplary embodiments, data transmitted to the print server through the cooperation server is described as the print job. However, print data not in a format of the print job can be transmitted to the print server from the cooperation server. In this case, in the following exemplary embodiments, the print server receiving the print data manages the print data in the format of the print job including information about predetermined setting and information about print control.

FIG. 1 is a block diagram illustrating a configuration example of a network system according to a first exemplary embodiment. As described above, in FIG. 1, the print system is constructed by using the two cloud services providing the print service. One of the cloud services includes a print server 101. The other cloud service includes a cooperation server 102.

Further, a client apparatus 103 that is used by the user to input print data through a network such as the Internet, and an image forming apparatus 104 that can print the print data received from the print system through the network are connected to the print system.

The print server 101 can manage print data input from the client apparatus 103 or the cooperation server 102 through the network 100, as a print job. The print job may be transmitted to and executed by the image forming apparatus 104. The print server 101 may transmit the print job in response to a print job request instruction from the image forming apparatus 104.

User information, apparatus information on one or more image forming apparatuses that print the print job transmitted from the print server 101, and other information are previously registered by accessing a registration service of the print server 101 through a web browser of an optional apparatus. The print server 101 further collects operation information such as statuses and print histories of the registered image forming apparatuses, from the image forming apparatuses at occurrence of an event or periodically, and manages the operation information. In a management screen provided to the web browser by the print server 101, a list of the registered image forming apparatuses, the statuses of the respective apparatuses, and the like can be checked.

The print server 101 is constructed in such a manner that programs to provide functions of the print server 101 are executed on one or more virtual machines realized by using hardware resources of a plurality of information processing apparatuses configuring the cloud service. The print server 101 can also be realized by causing a dedicated information processing apparatus to execute the programs.

The cooperation server 102 can receive the print data uploaded and input by the web browser of the client apparatus 103, through the network 100, and manage the print data. The cooperation server 102 can manage the print data as a print job including definition of the print setting and the like supported by the cooperation server 102. The cooperation server 102 may be able to provide a storage service or a document editing web application to the user. Data managed and edited by these services can be handled as print data.

The user information, the apparatus information of the image forming apparatuses, and other information can be previously registered in the cooperation server 102 by accessing a registration service of the cooperation server 102 through a web browser of an optional apparatus. Further, as an output destination of the print data, the print server 101 can be registered as a virtual printer. As a result, the cooperation server 102 can input (transfer) the print job managed by the cooperation server 102 itself to the print server 101 through the network 100. The print data can be input to the print server 101 from the cooperation server 102 while the image forming apparatus 104 is designated as an apparatus performing printing. In this case, apparatus information on the image forming apparatus 104 is registered in both of the cooperation server 102 and the print server 101. Alternatively, the print data can be input to the print server 101 from the cooperation server 102 while the apparatus performing printing is not designated, and therefore, the user can perform printing by accessing and requesting printing to the print server 101 from the image forming apparatus desired to be used by the user. In this case, printing can be performed also from an image forming apparatus not registered in the cooperation server 102.

The cooperation server 102 is constructed in such a manner that programs to provide functions of the cooperation server 102 are executed on one or more virtual machines realized by using hardware resources of a plurality of information processing apparatuses configuring the cloud service. The cooperation server 102 can also be realized by causing a dedicated information processing apparatus to execute the programs.

The client apparatus 103 executes client applications corresponding to the print server 101 and the cooperation server 102. The client applications may be dedicated applications that can create a print job, or may be general-purpose web browsers. Further, a mail application to check of a mail addressed to a mail address associated with the user account registered in the print server 101 or the cooperation server 102 is installed in the client apparatus 103. As a result, the client apparatus 103 can receive an error notification and the like by the mail.

The client apparatus 103 is disposed in a network environment of an office in which the user works, or in a network environment for a remote work, such as a home or a satellite office. The user may own one client apparatus 103 in each of the environments. The client apparatus 103 can communicate with the image forming apparatus 104 through wired or wireless network connection, a universal serial bus (USB) connection, or other connection; however, the client apparatus 103 is not necessarily connected to the image forming apparatus 104 in a local environment. Note that the number of client apparatuses different from the number illustrated in FIG. 1 may be connected.

The image forming apparatus 104 executes client applications corresponding to the print server 101 and the cooperation server 102. The image forming apparatus 104 can communicate with the print server 101 to exchange a print request, apparatus information (identification information) of the own apparatus, operation information (status, counter, log information, etc.), job information (print job, scan job, etc.), and the like, by using the client application. A providing source of the image forming apparatus 104 may be the vender (group) same as the vendor of the print server 101. The image forming apparatus 104 may be disposed in an office environment or in a network environment for remote work. In the following, an exemplary embodiment in a case where the image forming apparatus 104 is disposed in a network environment for remote work, such as a home, is mainly described. The image forming apparatus 104 may be connected to the print server 101 and the cooperation server 102 through a mobile network. Note that the number of image forming apparatuses different from the number illustrated in FIG. 1 may be connected.

Figure 2A:
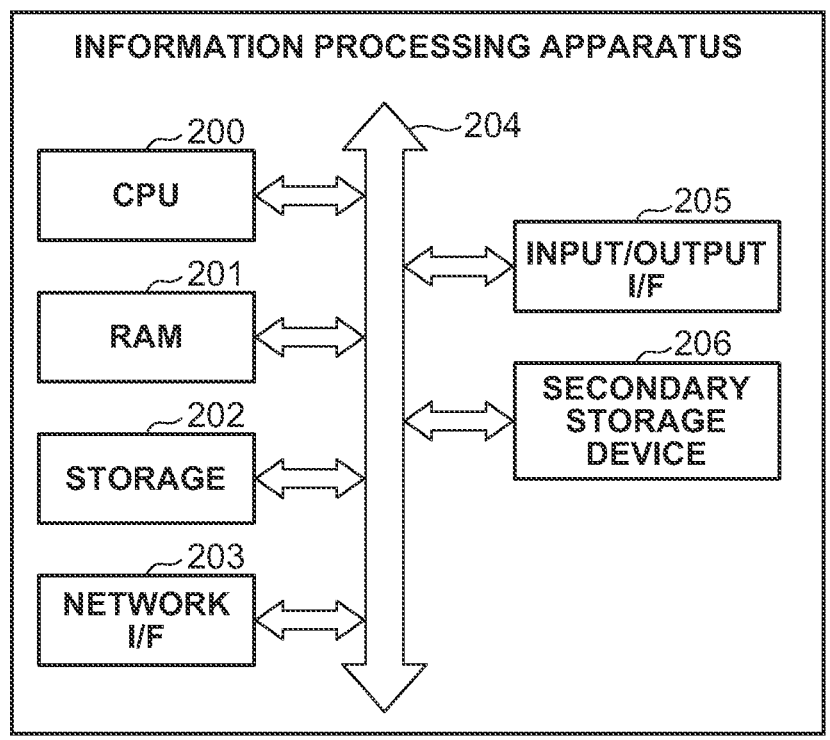
FIGS. 2A and 2B are diagrams illustrating respective hardware configuration examples of an information processing apparatus and an image forming apparatus.

FIG. 2A is a hardware configuration diagram of the information processing apparatus. A random access memory (RAM) 201 used as a temporary memory area is illustrated in FIG. 2A. A storage 202 is illustrated in FIG. 2A in which embedded programs and data are recorded. A network interface 203 is connected to the network and performs communication with the other computers and network apparatuses. A communication method may be any of wired communication and wireless communication. Further, the network interface 203 may hold a mobile network interface. An input/output interface 205 inputs/outputs information and signals through a display, a keyboard, a mouse, a touch panel, buttons, and the like. A computer not including the hardware can be connected from and operated by another computer through a remote desktop, a remote shell, or the like. A secondary storage device 206 represented by a hard disk drive (HDD) or a flash memory is illustrated in FIG. 2A. A central processing unit (CPU) 200 executes programs read from the RAM 201, the storage 202, the secondary storage device 206, and the like. In a case of the information processing apparatus constructing the print server 101, programs to realize functions and processing in flowcharts and the like described below are executed by the CPU 200. In a case of the information processing apparatus constructing the cooperation server 102, programs to realize functions and processing in flowcharts and the like described below are executed by the CPU 200. In a case of the information processing apparatus constructing the client apparatus 103, programs corresponding to the web browser, a client application for a dedicated client described below, and a mail application are executed by the CPU 200. These units are connected through a system bus 204. In the present exemplary embodiment, the system bus 204 propagates a control instruction from the CPU 200 to the hardware connected to the system bus 204 unless otherwise noted.

Figure 2B:
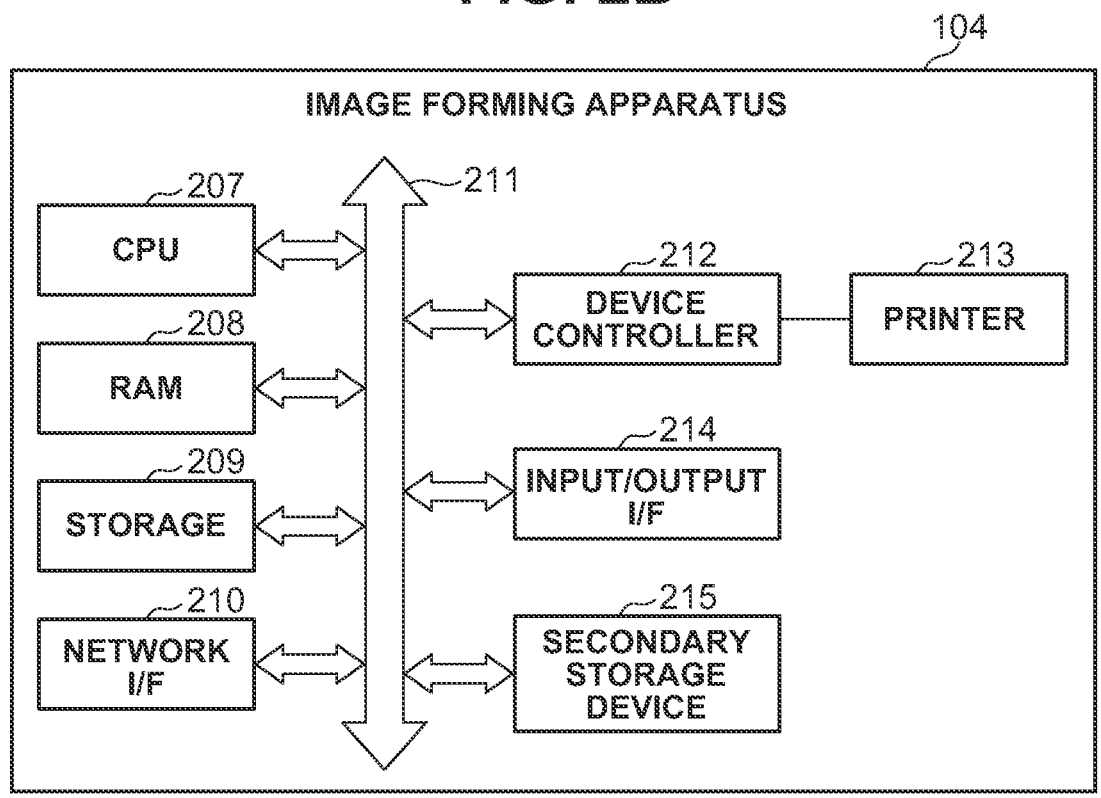

FIG. 2B is a hardware configuration diagram of the image forming apparatus 104. A RAM 208 used as a temporary memory area is illustrated in FIG. 2B. A storage 209 is illustrated in FIG. 2B in which embedded programs and data are recorded. A network interface 210 is connected to the network and performs communication with the other computers and network apparatuses. A communication method may be any of wired communication and wireless communication. Further, the network interface 210 may hold a mobile network interface. An input/output interface 214 inputs/outputs information and signals through a touch panel, buttons, and the like. A device not including the hardware can be connected from and operated by another computer through a remote interface and the like. A secondary storage device 215 represented by an HDD or a flash memory is illustrated in FIG. 2B. A CPU 207 executes programs read from the RAM 208, the storage 209, the secondary storage device 215, and the like. A printer 213 executes a job such as a print job. A device controller 212 receives a control instruction from the CPU 207 and controls the printer 213. These units are connected through a system bus 211. In the present exemplary embodiment, the system bus 211 propagates a control instruction from the CPU 207 to the hardware connected to the system bus 211 unless otherwise noted.

Figure 3:
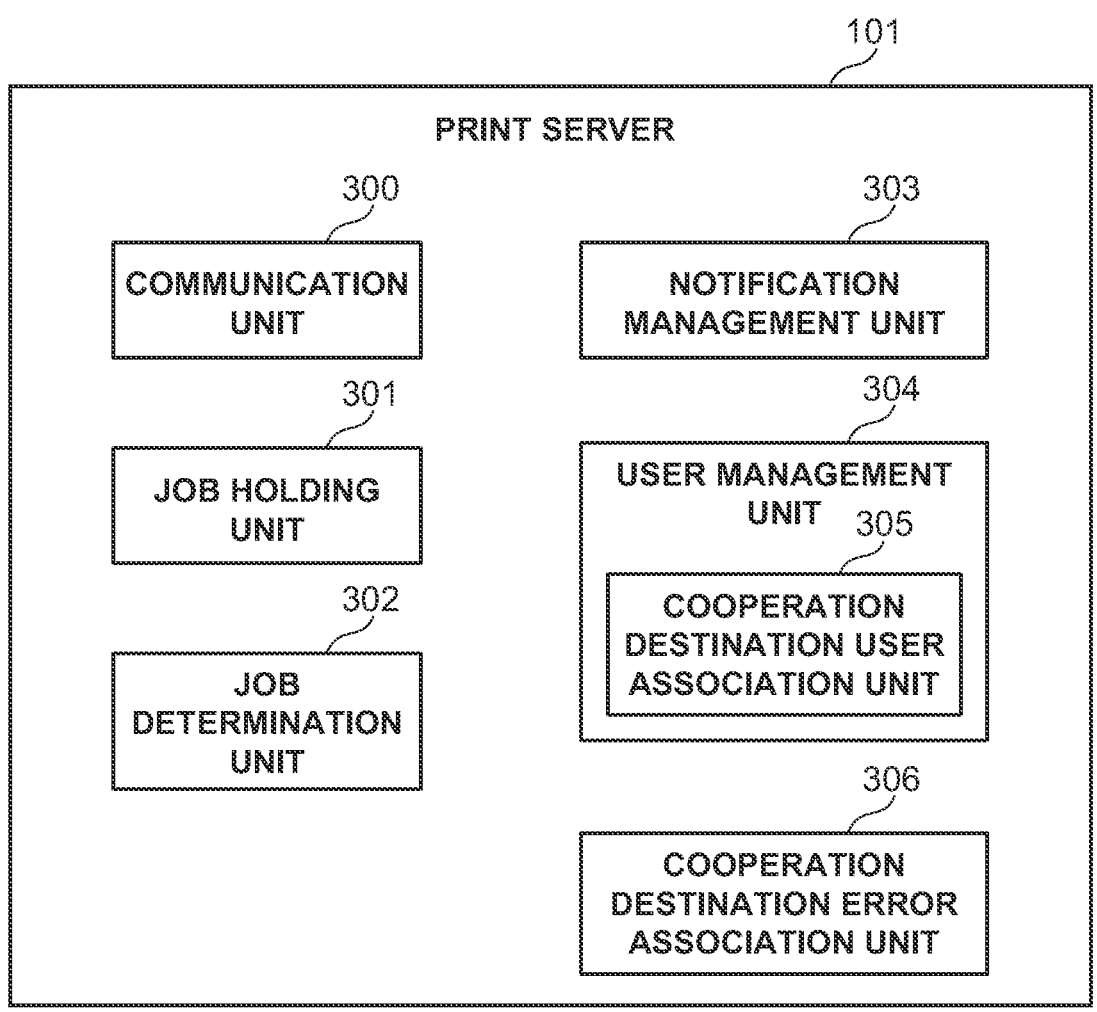
FIG. 3 is a diagram illustrating an example of a software module configuration of a print server.

FIG. 3 is a block diagram illustrating an example of a functional configuration of software modules of the print server 101. Programs of the print server 101 are read from the RAM 201, the storage 202, the secondary storage device 206, and the like, and are executed and realized by the CPU 200. Connection to an external apparatus such as the cooperation server 102 is performed through the network interface 203.

The print server 101 receives a print job input from the cooperation server 102 and the client apparatus 103 by a communication unit 300, and holds the print job in a job holding unit 301. A job determination unit 302 determines whether an error relating to processing based on the print job is absent. The error to be determined includes an error caused by print setting included in the print job, and an error detected in a case where the print job conflicts with a security policy of an organization to which the user as an owner of the print job belongs. In a case where such an error is absent, the print server 101 may transmit the print job to the image forming apparatus 104, and instruct the image forming apparatus 104 to execute printing. Alternatively, the print server 101 may hold the print job as it is, and return the print job in response to a print request from the image forming apparatus 104, thereby causing the image forming apparatus 104 to perform printing.

In a case where the job determination unit 302 determines that an error is present, a notification management unit 303 creates an error notification. At this time, the followings are checked from contents of the print job.

Presence/absence of service cooperation (with cooperation server 102)

User information on user as owner of print job

In a case where the service cooperation is absent, the notification management unit 303 refers to a user management unit 304, and notifies the user as the owner of the print job of a print job error. The error can be notified by a mail by specifying the user account registered in the print server 101 based on user identification information (ID) described as the owner in the print job, and using a mail address registered in association with the user account. The user can check an error of the own job by logging in a web site provided by the print server 101 with the user account.

In a case where the service cooperation is present, the notification management unit 303 refers to the user management unit 304, a cooperation destination user association unit 305, and a cooperation destination error association unit 306. The notification management unit 303 creates an error notification request by using the user information registered in the cooperation server 102, managed in association with the user ID described as the owner of the print job. The notification management unit 303 sends the error notification request to the cooperation server 102 through the communication unit 300.

An example of job information on the print job including information about presence/absence of the service cooperation is described below. In the following example, information indicating cooperation with the cooperation server 102 is described in a final line.

Print job including information about presence/absence of service cooperation

```
{
"JobId":"JOB00001",
"UserId":"USR00001",
"DocumentName":"DOC0001",
"DocumentPath":"/path/to/document",
"DocumentType":"text",
"Date":"2021/4/1",
"Time":12:34.56,
"Link":True,
"LinkedSystem":"Cooperation Server 102",
}
```

Specific examples of the error occurring in the print job include policy violation. An example of the error notification in the case where the policy violation occurs is described below. The error notification can include a job identifier ("JobId":"JOB00001") of the print job.

Example of Print Policy Violation Error Notification

```
{
"ErrorId":"ERR04011334",
"ErrorCode":"ERR0001",
"ErrorTitle":"Print Policy Error",
"ErrorDetail":"Print Policy Error is happened. Please check your policy.",
"UserId":"USR00001",
"Date":"2020/4/1",
"Time":13:34.56,
}
```

An example of a correspondence table between the user information registered in the print server 101 and the user information registered in the cooperation server 102, held by the cooperation destination user association unit 305 is described below. In the table, the identification information (ID) is used. User information having no association is also included.

TABLE 1

Cooperation User Correspondence Table

| User in Print Server 101 | User in Cooperation Server 102 |
|---|---|
| USR00001 | LinkedUser001 |
| USR00002 | LinkedUser007 |
| USR00003 | — |
| USR00004 | LinkedUser029 |
| ... | ... |

An example of a correspondence table between an error code in the print server 101 and an error code in the cooperation server 102, held by the cooperation destination error association unit 306 is described below.

TABLE 2

Cooperation Error Code Correspondence Table

| Error Code in Print Server 101 | Error Code in Cooperation Server 102 |
|---|---|
| ERR0001 | LinkedErr001 |
| ERR0002 | LinkedErr099 |
| ERR0003 | LinkedErr099 |
| ERR0004 | LinkedErr008 |
| ... | ... |

An example of the error notification request created with reference to the cooperation error code correspondence table is described below. This example corresponds to a notification in a case where an error of policy violation indicated by an error code "ERR0001" is detected in a job of a user "USR00001" registered in the print server 101. The error notification can include the job identifier ("JobId") of the print job.

Example of Print Policy Violation Error Notification Request

```
{
"Id":"NTF0001",
"Type":"Notification",
"LinkedErrorCode":"LinkedErr001",
"LinkedUserId":"LinkedUser001",
"Date":"2020/4/1",
"Time":14:34.56,
}
```

Figure 4:
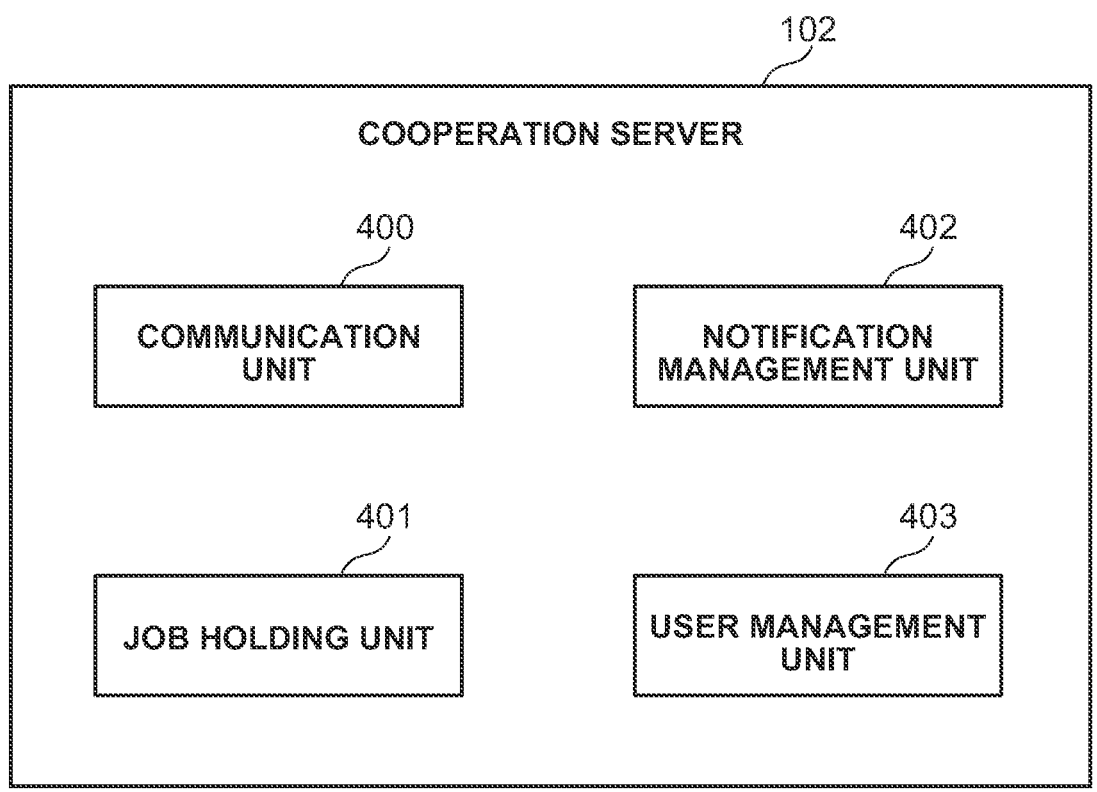
FIG. 4 is a diagram illustrating an example of a software module configuration of a cooperation server.

FIG. 4 is a block diagram illustrating an example of a functional configuration of software modules of the cooperation server 102. Programs of the cooperation server 102 are read from the RAM 201, the storage 202, the secondary storage device 206, and the like, and executed and realized by the CPU 200.

Access to an external apparatus such as the print server 101 is performed through the network interface 203.

The cooperation server 102 receives print data from the client apparatus 103 by a communication unit 400, and holds the print data in a job holding unit 401. The held print data can be input to the print server 101 through the communication unit 400. The cooperation server 102 can transmit a print job in a format of the print job including the print data and predetermined setting, to the image forming apparatus 104, and can instruct execution of printing. Alternatively, the cooperation server 102 may return the print job in response to a print request from the image forming apparatus 104.

The cooperation server 102 receives an error notification request from the print server 101 through the communication unit 400. A notification management unit 402 creates an error notification from contents of the error notification request. At this time, the followings are checked from the contents of the error notification request.

Job identifier of print job

Print job as target of error notification, and user as owner of print job

Error code

Further, the notification management unit 402 creates an error notification including the above-described checked information. The error can be notified by a mail by specifying the user account registered in the cooperation server 102 based on a user ID described in the error notification request, and using a mail address registered in association with the user account. The user can check an error of the own job by logging in a web site provided by the cooperation server 102 with the user account.

Figure 5A:
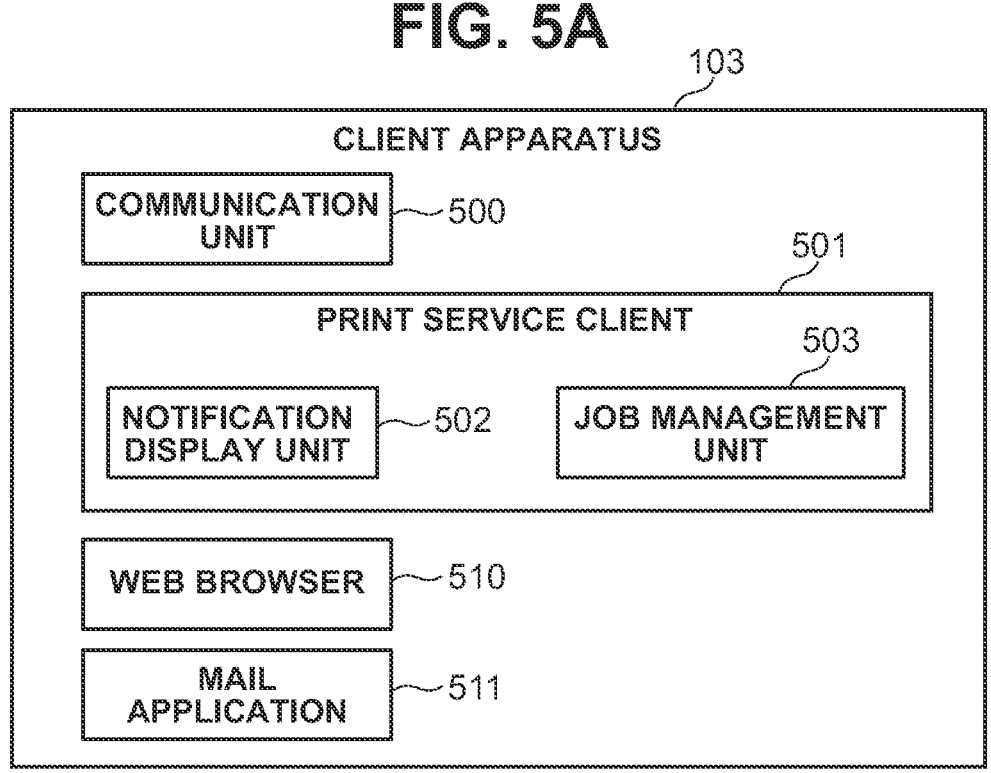
FIGS. 5A and 5B are diagrams each illustrating an example of a software module configuration of a client apparatus.

FIG. 5A is a block diagram illustrating an example of a functional configuration of software modules of the client apparatus 103. Programs of the client apparatus 103 are read from the RAM 201, the storage 202, the secondary storage device 206, and the like, and are executed and realized by the CPU 200. Access to an external apparatus such as the print server 101 is performed through the network interface 203.

A print service client 501 is installed in the client apparatus 103. The module is realized by a dedicated client application of the print server 101. The client apparatus 103 can access a web service site provided by the print server 101 and input print data by using a web browser as a substitute for the print service client 501. This case is on the premise of login operation with the user account registered in the service.

A job management unit 503 of the print service client 501 manages information on the print job. The job management unit 503 inputs the print job to the print server 101 through a communication unit 500. Further, the job management unit 503 can receive an error notification of the print job input from the job management unit 503, from the print server 101 through the communication unit 500.

A notification display unit 502 displays the received error notification. FIG. 12A illustrates a screen display sample when the error notification of the print job is received from the print server 101, and the notification display unit 502 displays the error notification.

A web browser 510 can designate a uniform resource locator (URL) and the like to access web pages provided by web servers held by the print server 101, the cooperation server 102, and the image forming apparatus 104. When the user accesses a cloud service including the cooperation server 102, and logs in the cloud service with the registered user account, the user can use a storage service and a document editing service. A mail application 511 to receive an e-mail is illustrated in FIG. 5A.

Figure 5B:
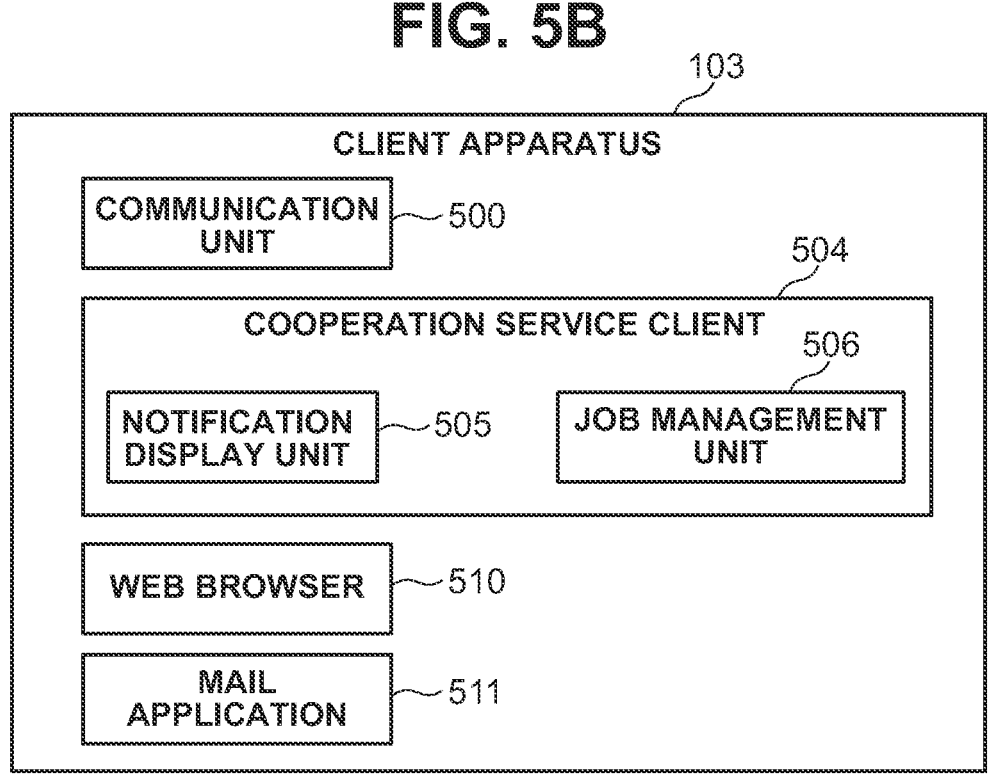

FIG. 5B is a block diagram illustrating another example of the functional configuration of the software modules of the client apparatus 103. A differential configuration from FIG. 5A is described.

In the example in FIG. 5B, a cooperation service client 504 is installed in the client apparatus 103. The module is realized by a dedicated client application for the cooperation server 102. The client apparatus 103 can access a web service site provided by the client server 102 and input print data by using a web browser as a substitute for the cooperation service client 504. This case is on the premise of login operation with the user account registered in the service.

In a case where the client apparatus 103 illustrated in the example in FIG. 5B performs printing from the print server 101, it is unnecessary to install the print service client 501, and the client apparatus 103 can input the print data to the print server 101 through the cooperation server 102.

A job management unit 506 of the cooperation service client 504 manages information on the print job. The job management unit 506 inputs the print job to the cooperation server 102 through the communication unit 500. A job error detected in the print job input to the print server 101 through the cooperation server 102 is notified based on the above-described error notification request. The error notification from the cooperation server 102 can be received by the mail application 511. In a case where any notification is directly received from the cooperation server 102, a notification display unit 505 can display the notification. FIG. 12B illustrates a screen display sample when the error notification of the print job is received from the cooperation server 102, and the notification display unit 505 displays the error notification.

Note that both of the print service client 501 and the cooperation service client 504 can be installed in the client apparatus 103.

Figure 6:
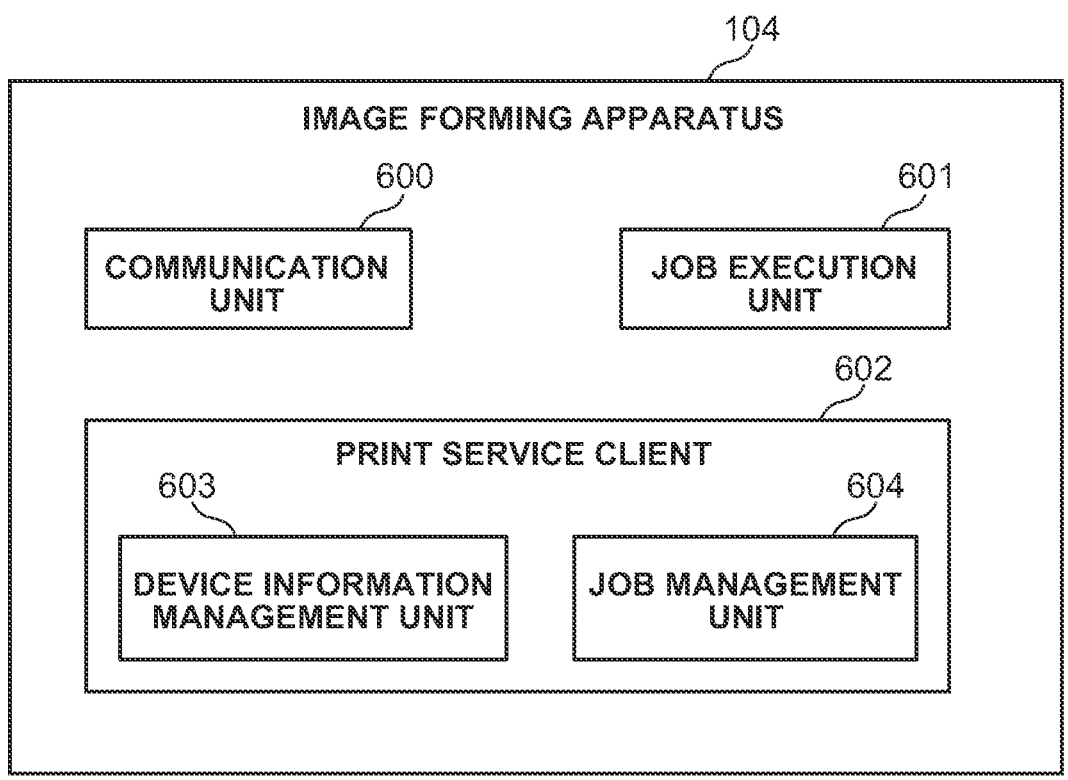
FIG. 6 is a diagram illustrating an example of a software module configuration of the image forming apparatus.

FIG. 6 is a block diagram illustrating an example of a functional configuration of software modules of the image forming apparatus 104. Programs of the image forming apparatus 104 are read from the RAM 208, the storage 209, the secondary storage device 215, and the like, and are executed and realized by the CPU 207. The CPU 207 controls the printer 213 through the device controller 212 to execute the print job and the like. Access to an external apparatus such as the print server 101 is performed through the network interface 210.

The image forming apparatus 104 includes a print service client 602. The image forming apparats 104 receives a print job from the print server 101 through a communication unit 600, and a job management unit 604 manages the print job. A job execution unit 601 executes the received print job. The image forming apparatus 104 can manage device identification information and device operation information (status, counter, log information, etc.) by a device information management unit 603. The image forming apparatus 104 can manage job information (print job, scan job, etc.) by the job management unit 604. The image forming apparatus 104 can communicate the information in the device information management unit 603 and the job management unit 604 with the print server 101 through the communication unit 600.

Figure 7:
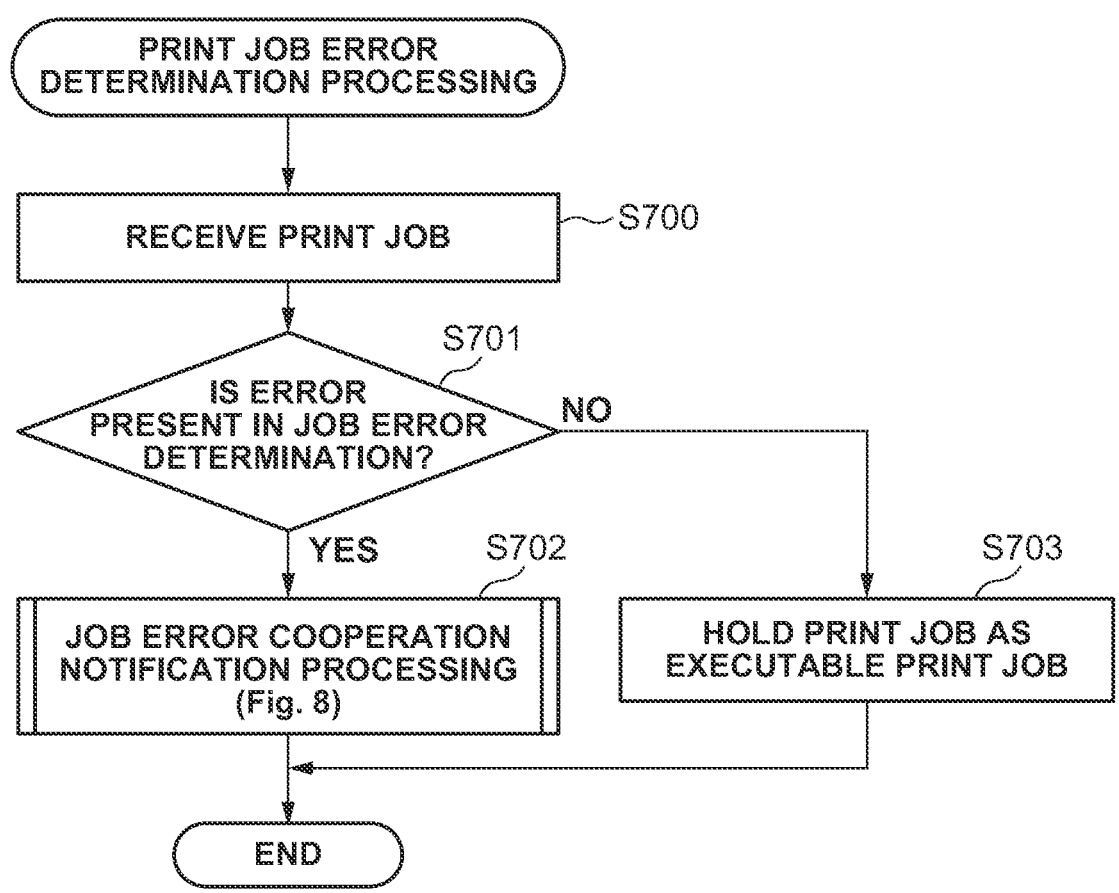
FIG. 7 is a flowchart illustrating error determination processing by the print server.

The print job error determination processing by the print server 101 is described with reference to a flowchart in FIG. 7.

In step S700, the print server 101 receives a print job by the communication unit 300. In step S701, the job determination unit 302 determines presence/absence of an error in the print job. In a case where an error is present (YES in step S701), the notification management unit 303 performs job error cooperation notification processing (FIG. 8) in step S702. The error detected from the job at this time is the above-described error about policy violation and the like. In contrast, in a case where an error is absent (NO in step S701), the job holding unit 301 holds the print job as an executable print job in step S703.

The job error cooperation notification processing by the notification management unit 303 of the print server 101 is described with reference to a flowchart in FIG. 8.

In step S800, the notification management unit 303 acquires attribute information on the print job. In step S801, the notification management unit 303 checks the following information from the attribute information on the print job.

Presence/absence of service cooperation

User as owner of print job

In a case where it is determined that the service cooperation is absent as a result of check of the contents about presence/absence of the service cooperation (NO in step S801), the notification management unit 303 refers to information managed by the user management unit 304, and notifies an error based on the user account as the owner of the print job in step S805.

In contrast, in a case where it is determined that the service cooperation is present (YES in step S801), the notification management unit 303 refers to information managed by the user management unit 304 and the cooperation destination user association unit 305, and acquires user information registered in the cooperation server 102, associated with the user information as the owner of the print job in step S802. In step S803, the cooperation destination error association unit 306 acquires an error code in the cooperation server 102, associated with the detected error.

In step S804, the notification management unit 303 creates an error notification request by imparting the user information and the error code in the cooperation server 102, acquired in steps S802 and S803, and the job identifier ("JobId") of the print job, and transmits the error notification request to the cooperation server 102.

The job error notification processing by the cooperation server 102 is described with reference to a flowchart in FIG. 9. In step S900, the communication unit 400 receives the error notification request of the print job from the print server 101. At this time, the notification management unit 402 checks the following information from the received error notification request.

Job identifier of print job
User information as owner of print job
Error code

Thereafter, the notification management unit 402 creates an error notification including the information. In step S901, the notification management unit 402 refers to information managed by the user management unit 403, and notifies the error to the user account as the owner of the print job. The notification is performed to the dedicated client application of the client apparatus 103.

The error notification processing by the client apparatus 103 is described with reference to a flowchart in FIG. 10. The processing is performed by the print service client 501 having received the notification in step S805 of FIG. 8, or by the cooperation service client 504 having received the notification in step S901 of FIG. 9. The processing is processing when the error notification is received, common to the print service client 501 and the cooperation service client 504. The following description is given while the print service client 501 and the cooperation service client 504 are collectively referred to as a client. When the user logs in the client by inputting operation to the client, the processing is started.

In step S1001, the client determines whether the error notification associated with the login user is present. In a case where the error notification including the user information corresponding to the identification information on the login user of the client is received, it is determined that the error information is present. In a case where the error notification associated with the login user is absent (NO in step S1001), the processing ends.

In contrast, in a case where the error notification associated with the login user is present (YES in step S1001), the client displays the error notification information by the notification display unit 502 in step S1002.

In a second exemplary embodiment, when an error of the print job occurs, the attribute information on the print job is checked. In a case where the print job does not have service cooperation, an error notification mail is transmitted to a mail address associated with the user account holding the print job. In a case where the print job has service cooperation, an account of a cooperation destination service associated with the user account holding the print job is acquired. The error notification mail is transmitted to a mail address associated with the account of the cooperation destination service.

The user can receive and check the error notification addressed to the mail address corresponding to the account registered in any of the cloud services, by using the mail application 511 of the client apparatus 103.

In the present exemplary embodiment, differences from the first exemplary embodiment are described below.

Figure 8:
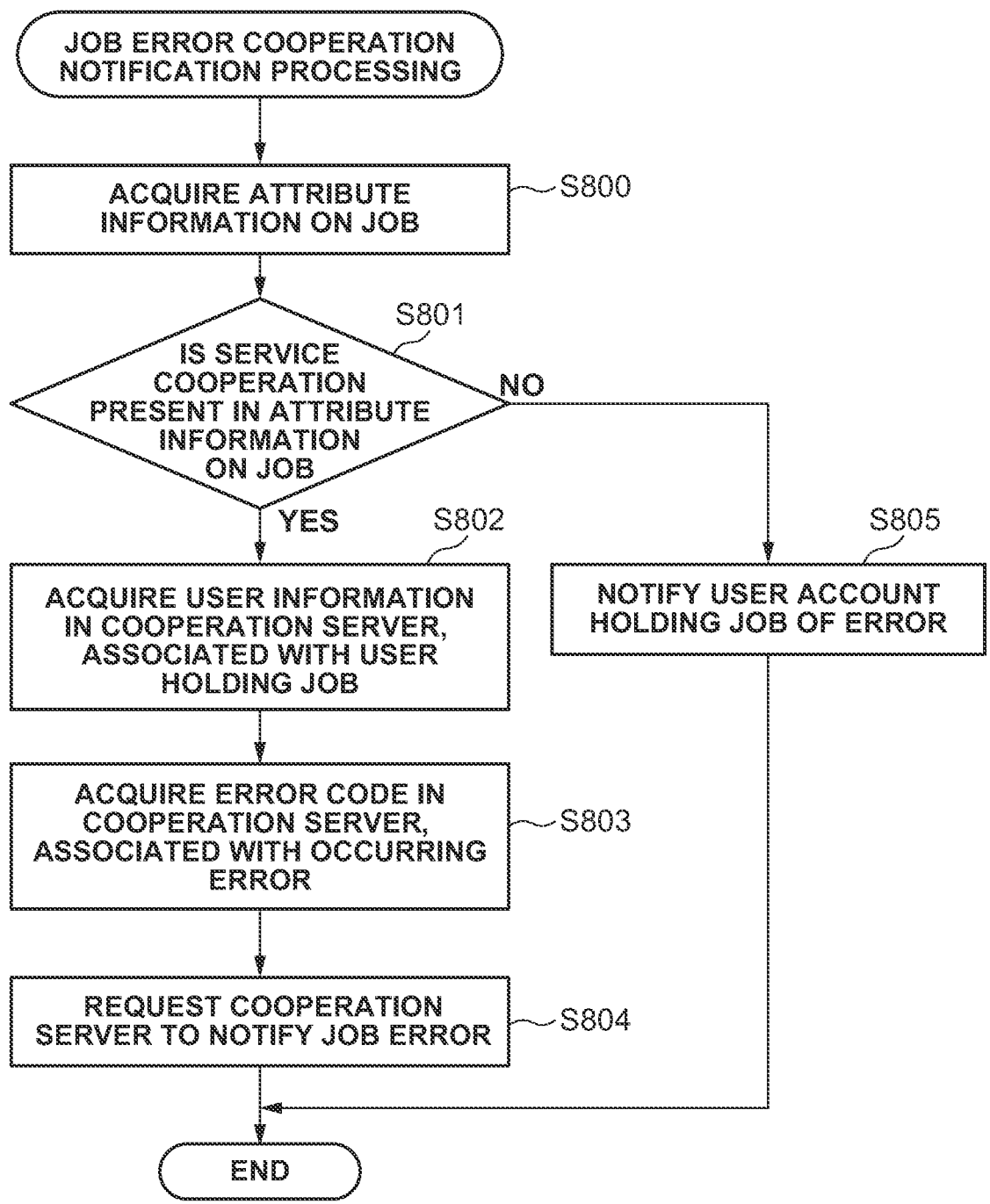
FIG. 8 is a flowchart illustrating error notification processing by a print server according to a first exemplary embodiment.
Figure 9:
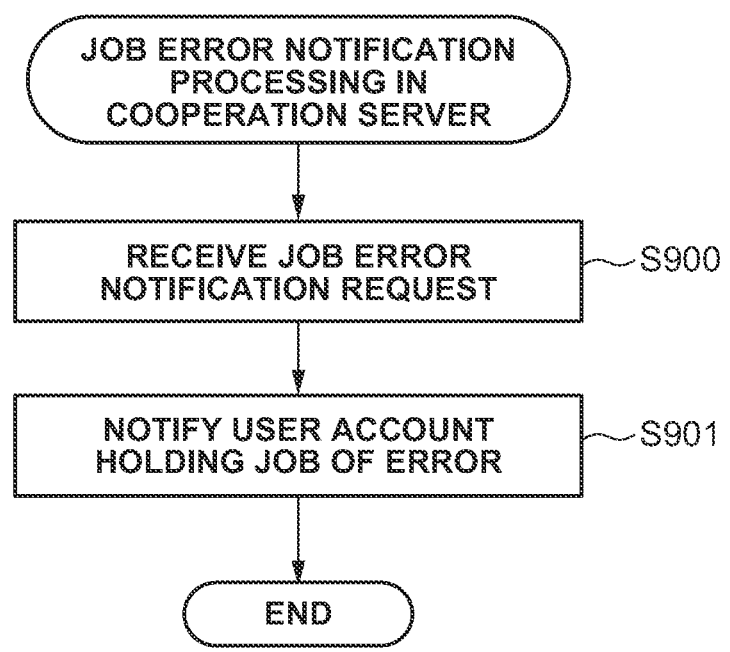
FIG. 9 is a flowchart illustrating error notification processing by a cooperation server according to the first exemplary embodiment.
Figure 10:
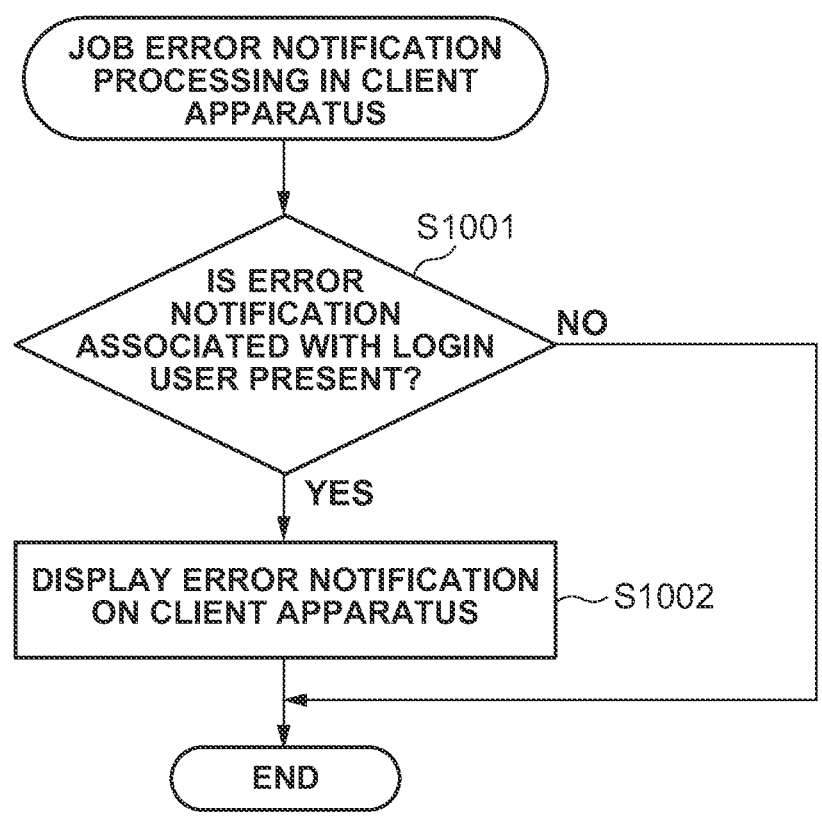
FIG. 10 is a flowchart illustrating error notification processing by a client apparatus according to the first exemplary embodiment.

In step S805 of FIG. 8 and step S901 of FIG. 9, the print server 101 and the cooperation server 102 specify a registered mail address associated with the account of the user as the job owner that is a notification target. Further, the error is notified to the mail address by an e-mail.

Further, in step S804, the print server 101 transmits the following error notification request to the cooperation server 102. In the error notification request, an e-mail ("e-mail") is designated as a notification type. As described above, the request may include the job identifier.

Example of Print Policy Violation Error Notification Mail Request

```
{
"Id":"MAIL0001",
"Type":"e-mail",
"LinkedErrorCode":"LinkedErr001",
"LinkedUserId":"LinkedUser001",
"Date":"2020/4/1",
"Time":14:34.56,
}
```

Figure 11:
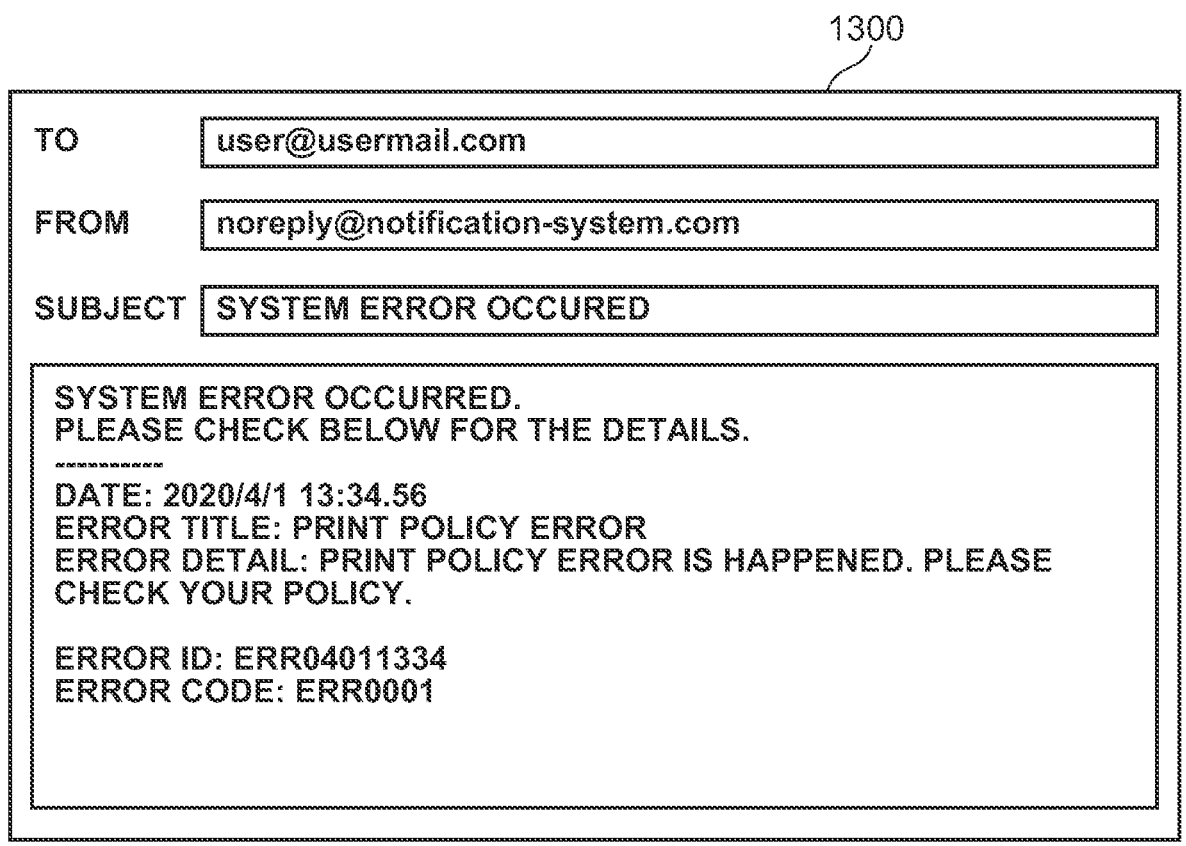
FIG. 11 illustrates an example of an error notification mail.

FIG. 11 illustrates a sample of the job error notification mail according to the second exemplary embodiment. A body of the mail includes an error code and information on an occurrence date. The body of the mail can include easily grasped information of a transmission source system (print server 101 and cooperation server 102), and the job identifier.

Application Examples

The error notification to the screen and the error notification by the e-mail described in the first and second exemplary embodiments may be both performable. Alternatively, the user may select and set a notification destination on the screen. At this time, the user may select the notification destination, for example, the error notification to the screen, the error notification by the e-mail, or a plurality of mail addresses.

Figure 13:
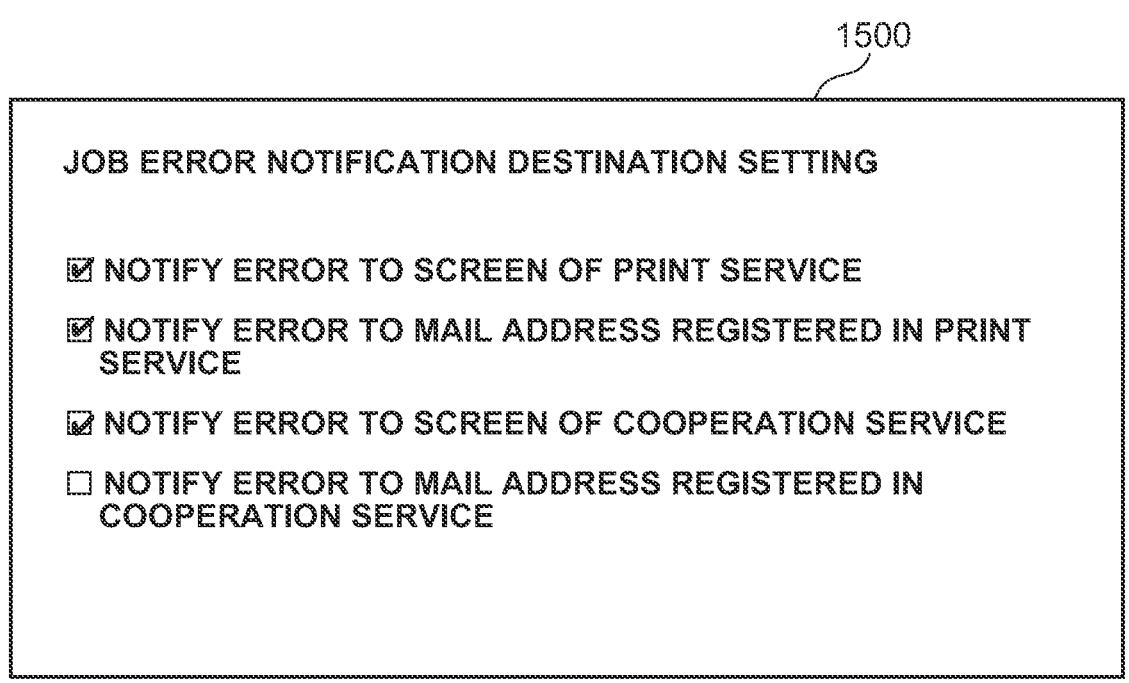
FIG. 13 illustrates an example of an error notification destination setting screen.

FIG. 13 illustrates a sample of a setting screen for setting of the notification destination of the job error.

In the first and second exemplary embodiments, the notification to the client apparatus 103 and to the e-mail address of the user is described. However, at the same time, an error may be notified to the screen of the image forming apparatus 104 registered in the service.

The error notification to the screen and the error notification by the e-mail described in the first and second exemplary embodiments may not be necessarily performed with the error of the print job as a trigger. For example, when an apparatus error occurs on the image forming apparatus 104 registered in the service, an error notification may be transmitted from the device information management unit 603 to the print server 101 through the communication unit 600. The print server 101 may receive the error notification, and perform the error notification described in the first and second exemplary embodiments, to the user using the registered image forming apparatus 104.

Other Exemplary Embodiments

Embodiments of the present disclosure also include an apparatus or a system configured by appropriately combining the above-described exemplary embodiments, and a method thereof.

Embodiments of the present disclosure include an apparatus or a system as a main body executing one or more pieces of software (programs) to realize the functions of the above-described exemplary embodiments. Further, a method to realize by above-described exemplary embodiments, executed by the apparatus or the system is also included in embodiments of the present disclosure. The programs are supplied to the system or the apparatus through a network or various kinds of storage media, and the programs are read to one or more memories and are executed by one or more computers (CPU, microprocessor unit (MPU), etc.) of the system or the apparatus. In other words, embodiments of the present disclosure further include the programs themselves, or the various kinds of computer-readable storage media storing the programs. In addition, embodiments of the present disclosure can be realized by a circuit realizing the functions of the above-described exemplary embodiments (e.g., application specific integrated circuits (ASIC)).

According to embodiments of the present disclosure, even in the case where the print system is constructed by causing the plurality of cloud services to cooperate with each other, it is possible to provide the mechanism to appropriately notify an error.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-166729, filed Oct. 11, 2021, which is hereby incorporated by reference herein in its entirety.

What is claimed is:

1. A second system cooperating with a first system communicating with a client apparatus, the second system comprising:
    at least one memory storing instructions; and
    at least one processor executing the instructions causing the second system to:
        manage second user information registered in the second system;
        receive a print job;
        in a case where an error is not detected in the received print job, hold the received print job, wherein the held print job is to be transmitted to a printer so that the held print job is executed by the printer;
        in a case where an error is detected in the received print job and the print job is received from the first system, request the first system to perform an error notification to first user information registered in the first system, wherein the first user information corresponds to an owner of the print job; and
        in a case where an error is detected in the received print job and the print job is received from the client apparatus without through the first system, notify the error based on the second user information as an owner of the print job.

2. The second system according to claim 1, wherein an e-mail is used for the error notification performed by the first system.

3. The second system according to claim 1, wherein the instructions further cause the second system to provide a setting screen for selection of a notification method of the detected error.

4. A method by a second system cooperating with a first system communicating with a client apparatus, the method comprising:
    managing second user information registered in the second system;
    receiving a print job;
    in a case where an error is not detected in the received print job, holding the received print job, wherein the held print job is to be transmitted to a printer so that the held print job is executed by the printer;
    in a case where an error is detected in the received print job and the print job is received from the first system, requesting the first system to perform an error notification to first user information registered in the first system, wherein the first user information corresponds to an owner of the print job; and
    in a case where an error is detected in the received print job and the print job is received from the client apparatus without through the first system, notifying the error based on the second user information as an owner of the print job.

5. The method according to claim 4, wherein an e-mail is used for the error notification performed by the first system.

6. The method according to claim 4, further comprising providing a setting screen for selection of a notification method of the detected error.

7. The second system according to claim 1, wherein the first system can manage and transmit a print job to the printer so that the print job is executed by the printer.

8. The method according to claim 4, wherein the first system can manage and transmit a print job to the printer so that the print job is executed by the printer.

* * * * *